United States Patent [19]
Wanger et al.

[11] Patent Number: 5,501,161
[45] Date of Patent: Mar. 26, 1996

[54] PROCESS FOR THE THERMAL TREATMENT OF SOLIDS WHICH ARISE IN THE PURIFICATION OF FLUE GASES

[75] Inventors: Harald Wanger, Brugg; Hans Ruegg, Wohlen, both of Switzerland

[73] Assignee: Von Roll-AG, Gerlafingen, Switzerland

[21] Appl. No.: 258,172

[22] Filed: Jun. 10, 1994

[30] Foreign Application Priority Data

Jun. 17, 1993 [CH] Switzerland ............ 01804/93

[51] Int. Cl.$^6$ .................................................. F23J 3/00
[52] U.S. Cl. .................... 110/344; 110/259; 110/165 A
[58] Field of Search ............................ 110/216, 204, 110/259, 165 A, 165 R, 342, 343, 344, 345, 244, 266, 301, 236, 245

[56] References Cited

U.S. PATENT DOCUMENTS

| | | | |
|---|---|---|---|
| 4,599,952 | 7/1986 | Meier | 110/216 |
| 5,005,495 | 4/1991 | Feitel. | |
| 5,264,654 | 11/1993 | Kreft et al. | 110/236 X |
| 5,289,920 | 3/1994 | Godderidge et al. | 110/236 X |
| 5,305,696 | 4/1994 | Mendenhall | 110/236 |

FOREIGN PATENT DOCUMENTS

| | | |
|---|---|---|
| 0476727A1 | 3/1992 | European Pat. Off.. |
| 3703984A1 | 8/1988 | Germany. |
| 3744287A1 | 7/1989 | Germany. |
| 3802884A1 | 8/1989 | Germany. |

Primary Examiner—Denise L. Gromada
Assistant Examiner—Susanne C. Tinker
Attorney, Agent, or Firm—Oblon, Spivak, McClelland, Maier & Neustadt

[57] ABSTRACT

Dustlike and/or finely divided solids which arise in the purification of flue gases, in particular from refuse incineration plants, are subjected to a thermal treatment. In this case, the said solids are fed to a filter device along a predetermined transport path by a gas stream having at least the thermal treatment temperature. After the filtration, the solids can be subjected to a thermal post-treatment. The thermal treatment can serve to destroy halogenated, in particular aromatic, hydrocarbons, to remove ammonia or other volatile constituents.

21 Claims, 1 Drawing Sheet

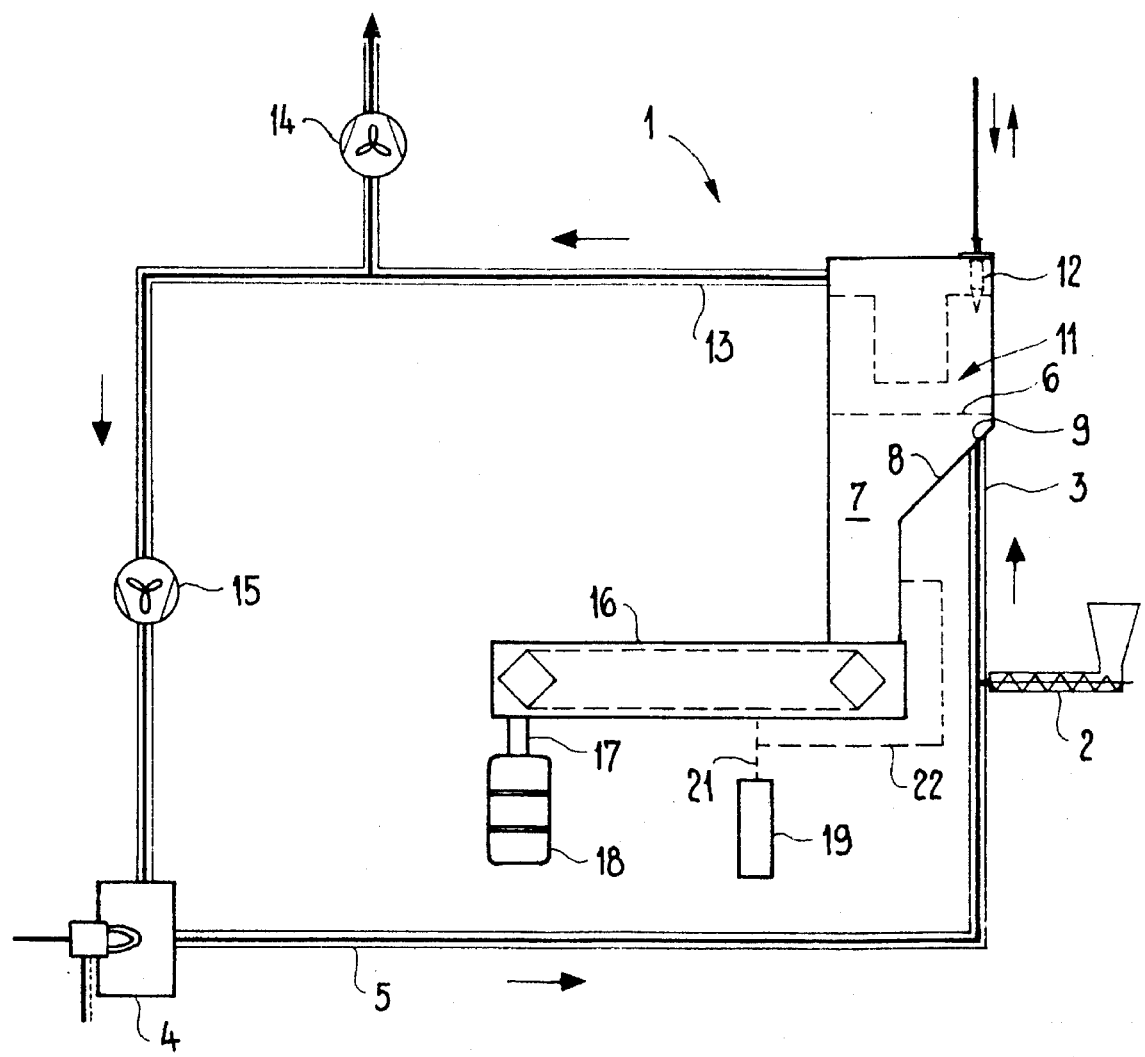

PROCESS FOR THE THERMAL TREATMENT OF SOLIDS WHICH ARISE IN THE PURIFICATION OF FLUE GASES

BACKGROUND OF THE INVENTION

1. Field of the Invention

The invention relates to a process for the thermal treatment of dustlike and/or finely divided solids which arise in the purification of flue gases.

2. Discussion of the Background

It is known that polychlorinated hydrocarbons form in the incineration of refuse in the presence of an oxygen excess. Thus Olie, K. et al. reported in Chemosphere 1977, 6, 455 on polychlorinated dibenzodioxins (PCDDs) and polychlorinated dibenzofurans (PCDFs) in dusts from electrostatic precipitators of domestic refuse incineration plants.

Hagenmaier, H. et al. in Environ. Sci. & Technol 987, 21, 1080 report that the limitation of oxygen in the catalytic dechlorination at 300° to 400° C. leads to substantial destruction of PCDDs and PCDFs.

This finding is utilized in the device described in DE-A 3,703, 984 for the destruction of halogenated aromatic compounds. The thermal treatment takes place here in a drum closed off from the external atmosphere and with no continuous flow through it. The fly ash to be treated is transported in axial and radial direction through the drum by means of panels mounted on a rotatable shaft. During this, the transported material is compressed and the drum outlet as a consequence is occasionally blocked, which leads to interruption of operation. Sealing the drum, in particular the bearing, is problematic. The oxygen in the air entering as a result of the leakage leads to the reverse reaction, i.e. to reformation of the chlorinated hydrocarbons to be destroyed. The heat required for the fly ash treatment is supplied via the drum wall in this known process; in this case, for an effective treatment temperature of up to 400° C., wall temperatures of up to 600° C. are required. At this high temperature, the chlorine formed in the treatment produces corrosion of the device and low-melting-point salts present in the fly ash can form caking which can lead to jamming or choking of the plant. In practice, the drum must be provided with a vapor extraction device, the filter of which regularly plugs.

SUMMARY OF THE INVENTION

The object of the present invention is to propose a process and an apparatus for the thermal treatment of dusts and finely divided solids arising in the flue gas purification which ensures an uninterrupted, continuous operation with the lowest possible plant temperature.

In the process according to the invention, the thermal treatment of the dustlike and/or finely divided solid is carried out during the pneumatic transport of the solid. In this case, the flowing transport medium, which comes into contact with each individual dust grain and solids piece and is preheated to the desired temperature, simultaneously serves as a heat source, i.e. as a treatment medium. Consequently, the treated solid and the resulting gases, during the entire treatment, do not come into contact with apparatus parts having undesirably high temperatures. As a result of the pneumatic transport, there is also virtually no risk of choking. Any choking which may possibly occur can be prevented by periodic cleaning of the pipe with an annular cleaning ram without interruption of the gas feed. Since the predetermined transport path is simultaneously a treatment path, the apparatus can be kept small and economical. At the end of the transport/treatment path, the solid is separated from the gas stream by filtration, whereupon the solid-free gas stream can be reused as transport/treatment medium. This gas stream automatically conducts the gaseous products of the thermal treatment away from the treatment area.

If required, the thermal treatment can be followed by a stationary post-treatment at about the treatment temperature, generally above 300° C., preferably above 400° C. The post-treatment can last for at least 2, preferably longer than 4, hours. It is expediently carried out under an inert gas atmosphere.

The pressure in the system can easily be controlled by a fan so that undesirable entry of air, and thus entry of oxygen, can be prevented without a problem. The oxygen concentration should not exceed 3%.

Dustlike and/or finely divided solids to be treated according to the invention from the flue gas purification which can be mentioned are, for example, fly ash, dried salts from the flue gas purification plant of a refuse incineration plant (scrubber salts) and adsorption materials laden with environmentally harmful substances.

BRIEF DESCRIPTION OF THE DRAWING

The invention is described in more detail with reference to the single figure and the examples.

FIG. 1 shows, purely diagrammatically, an apparatus for carrying out the process according to the invention.

DESCRIPTION OF THE PREFERRED EMBODIMENTS

The apparatus 1 according to the invention depicted in FIG. 1 for carrying out the thermal treatment according to the invention has a screw metering device 2 which opens out into a vertical pipe 3. The vertical pipe 3 at the same time forms a straight transport path running from bottom to top and a treatment space for the dustlike and/or finely divided solids. It is the continuation of a horizontal pipe 5, upstream of which is connected a combustion chamber 4. The gas stream can also be heated electrically instead of with a burner. Obviously, all pipes in this apparatus are insulated. The vertical pipe 3 opens out freely upstream of a filter 6 into an insulated heatable delay space 7, in which the post-treatment takes place. The filter 6 forms the upper horizontal closure of the delay space 7 and is fitted out with (undepicted) ceramic filter candles. The junction 9 of the vertical pipe 3 in the delay space 7 is situated in a wall 8, inclined toward the exterior, of the delay space, in such a way that there is no constriction between the filter 6 and the delay space 7. An (undepicted) vibrator is provided on the inclined wall 8. On the clean side 11 of the filter 6 is arranged a cleaning apparatus 12 for the vertical pipe 3. It is constructed as an annular ram and therefore permits the continuation of the gas flow even during the cleaning operation. On the clean side 11 of the filter 6 is connected a further pipe 13 which is connected to an exhaust gas fan 14 and a circulation fan 15 connected upstream of the combustion chamber 4. Some of the circulating gas stream is taken off by means of the exhaust gas fan 14. This part-stream is equivalent to the amount of gas introduced into the combustion chamber via the gas burner.

A discharge apparatus 16, here a Redler conveyor, for the thermally treated solid is connected to the bottom part of the delay space 7. The outlet 17 of the discharge apparatus 16 opens out, if necessary air-tightly, into a storage vessel 18.

Furthermore, an inert gas reservoir 19 is provided which has connection lines 21, 22 to the delay space 7 and to the discharge apparatus 16.

In addition from bottom to top, as depicted in the figure, the transport path can run in any desired direction, e.g. horizontally, in particular from top to bottom.

The following examples can be carried out with the apparatus according to FIG. 1.

EXAMPLE 1

Thermal treatment of fly ash for the destruction of chlorinated hydrocarbons.

In a combustion chamber fitted out with a propane gas burner, a refuse incineration plant flue gas stream freed from fly ash is heated to 480° C. to 500° C. This gas stream passes through an insulated pipe into a likewise insulated vertical pipe section. The fly ash to be treated is continuously fed into this vertical pipe section by means of a screw metering apparatus. At the feed position, the gas velocity is approximately 12 m/sec. The fly ash is pneumatically transported in the vertical pipe section over a path of at least 2.5 m to a filter. During the transport, the fly ash is heated to 400° C. or above.

The filter is provided with temperature-resistant ceramic filter candles on which the fly ash is deposited at a temperature of 400° C. or above. The deposited fly ash passes from the filter directly into a delay space arranged therebeneath, in which an inert gas atmosphere can be maintained with nitrogen or carbon dioxide.

The fly ash separated off from the flue gas remains for 4 hours in the delay space, which is heated to 400° C. and insulated. After this delay time, the fly ash can be discharged by a suitable discharge system, e.g. a Redler conveyor, a cooled screw conveyor or a cooling drum, under level control. Cooling of the material on discharge to a temperature of below 200° C. is desirable in order to prevent reformation of the chlorinated hydrocarbons. Cooling can also be performed by quenching. During the discharge operation, a vibrator arranged on a delay space wall inclined toward the outside is also operated.

Some of the gas stream is taken off from the circulation, but the majority is fed back to the combustion chamber by means of a circulation fan.

The oxygen concentration in the entire system is set to 2 to 3%, in order to ensure the destruction of the chlorinated, in particular aromatic, hydrocarbons. An oxygen sensor is therefore installed upstream of the metering device. The following are likewise determined during the process: the flow rate of the flue gas, its temperature upstream and downstream of the solid addition, the temperature in the filter and the pressure drop across the filter. The filter can optionally be cleaned in dependence on the pressure drop or periodically.

EXAMPLE 2

Thermal treatment of scrubber salt for the expulsion of ammonia.

To reduce undesirable nitrogen oxides in the flue gas, ammonia is added to the latter. The excess amount of ammonia is removed from the flue gas in a scrubber. The scrubber liquid is spray-dried, in which case the so-called scrubber salt arises as a dry dust-like product. The ammonia is present as ammonium salt in this scrubber salt and can be released by heating, preferably to temperatures above 300° C.

The scrubber salt is treated in the same manner as described in Example 1. However, in this case, lower temperatures are employed and the treated scrubber salt can be discharged after filtration without a delay time. The expelled ammonia is reused, preferably by dissolving the gaseous ammonia in water, e.g. in a gas scrubber. The solution obtained is freed from any mercury present by means of an ion exchanger and fed back to the nitrogen oxide reduction.

If chlorinated hydrocarbons are to be destroyed simultaneously with the expulsion or ammonia, the treatment is carried out according to Example 1.

EXAMPLE 3

Thermal treatment of activated charcoal for the destruction of chlorinated hydrocarbons and removal of ammonia.

To remove chlorinated hydrocarbons from the flue gas of the refuse incineration plant, activated charcoal or activated coke is injected into the flue gas stream. This activated charcoal or activated coke, which is laded with undesirable substances, in particular chlorinated hydrocarbons, is separated out from the flue gas stream.

Before landfilling, activated charcoal and activated coke must be thermally treated, in order that the chlorinated hydrocarbons can be destroyed. In this treatment, any ammonia present can also be recovered.

The treatment is carried out by the process described in Example 1, particularly close attention being paid to the oxygen content because of the flammability of activated charcoal or activated coke. The oxygen concentration should preferably be less than 2%. In order to prevent the entry of air at all events, a slight cleaning-side overpressure is maintained in the hot gas filter.

For the same reason, the filter candles are cleaned by inert gas.

We claim:

1. A process for thermal treatment of dustlike solids which are separated in a purification of flue gases, the process comprising the steps of:

feeding dustlike solids along a predetermined transport path to a filter device by means of a gas stream having at least a thermal treatment temperature, thereby decomposing chlorinated hydrocarbons or ammonium salts or chlorinated hydrocarbons and ammonium salts and, after filtration;

discharging the dustlike solids.

2. A process according to claim 1, wherein the gas stream is circulated.

3. A process according to claim 1, wherein the gas stream is a flue gas freed from fly ash.

4. A process according to claim 1, wherein as a result of the thermal treatment, halogenated hydrocarbons in the dustlike solids are destroyed, a thermal post-treatment in a steady state being allowed to follow the thermal treatment, subsequent to the filtration.

5. A process according to claim 4, wherein the thermal post-treatment is carried out subsequent to the filtration by delay at a treatment temperature under an inert gas atmosphere.

6. A process according to claim 4, wherein the dustlike solids are heated to above a temperature of 300° C., and the thermal post-treatment is carried out at said temperature for at least 2 hours.

7. A process according to claim 6, wherein the dustlike solids, after the treatment, are kept under an inert gas atmosphere during the discharge.

8. A process according to claim 1, wherein the thermal treatment is carried out at an oxygen concentration of at most 3%.

9. A process according to claim 1, wherein the dustlike solids are quenched after the thermal treatment.

10. A process according to claim 1, wherein, as a result of the thermal treatment, volatile constituents, including ammonia are removed from the dustlike solids.

11. A process according to claim 10, wherein the thermal treatment is carried out at above 300° C.

12. A process according to claim 10 wherein the ammonia is a gaseous ammonia which is dissolved in water to form an aqueous ammonia solution, the process comprising the further step of removing mercury present from the aqueous ammonia solution by means of an ion exchanger and feeding the mercury-free aqueous ammonia solution to the refuse incineration plant flue gas to reduce nitrogen oxides.

13. An apparatus for a thermal treatment of dustlike solids which are separated in a purification of flue gases, the apparatus comprising:

a pipe connected to a fan and a heating device for gas, said pipe forming a transport path and treatment space for the dustlike solids, such that in a first end region of the pipe a feed device for the solid opens out, and at a second end region of the pipe a filter device having filters of temperature-resistant material is positioned, said heating device heats a gas stream transported by the fan to a thermal treatment temperature to carry dustlike solids from the feed device to the filter device while decomposing chlorinated hydrocarbons or ammonium salts or chlorinated hydrocarbons and ammonium salts.

14. An apparatus according to claim 13, wherein, subsequent to the filter device, is arranged a delay space, the filter device forming a closure of the delay space for a thermal post-treatment.

15. An apparatus according to claim 14, wherein the pipe opens out freely into the delay space upstream of the filter device.

16. An apparatus according to claim 13, further comprising a cleaning device in the form of an annular ram for the pipe.

17. An apparatus according to claim 13, wherein the pipe is arranged vertically, the feed device opening out into its top end region and the filter device following at its bottom end.

18. A process according to claim 4, wherein said halogenated hydrocarbons are aromatic hydrocarbons.

19. A process according to claim 4, wherein the dustlike solids are heated to above a temperature of 400° C., and the thermal post-treatment is carried out at said temperature for at least 4 hours.

20. A process according to claim 1, wherein the dustlike solids to be treated are separated in a purification of flue gases of refuse incineration plants.

21. A process for thermal treatment of dustlike solids which are separated in a purification of flue gases, the process comprising the steps of:

feeding dustlike solids along a predetermined transport path to a filter device by means of a gas stream having at least a thermal treatment temperature and, after filtration;

discharging the dustlike solids;

wherein the gas stream is a flue gas freed from fly ash.

* * * * *